United States Patent [19]
Kim

[11] Patent Number: 5,694,178
[45] Date of Patent: Dec. 2, 1997

[54] START AND END ADDRESS GENERATING CIRCUIT FOR PERFORMING MOTION COMPENSATION DURING MOVING PICTURE COMPRESSION CODING

[75] Inventor: Eui-Gyu Kim, Ahnyang, Rep. of Korea

[73] Assignee: Samsung Electronics Co., Ltd., Kyungki-do, Rep. of Korea

[21] Appl. No.: 640,123

[22] Filed: Apr. 30, 1996

[30] Foreign Application Priority Data

Jun. 19, 1995 [KR] Rep. of Korea .................. 16282/1995

[51] Int. Cl.[6] ..................................................... H04N 7/28
[52] U.S. Cl. ............................................. 348/699; 348/420
[58] Field of Search ......................................... 348/384, 390, 348/401, 402, 409, 411, 412, 413, 415, 416, 420, 699, 716, 717, 718; 382/232, 233, 236, 238

[56] References Cited

U.S. PATENT DOCUMENTS

| | | |
|---|---|---|
| 4,691,230 | 9/1987 | Kaneko et al. .................. 348/416 |
| 4,695,882 | 9/1987 | Wada et al. .................. 348/416 |
| 5,253,053 | 10/1993 | Chu et al. . |
| 5,475,754 | 12/1995 | Bridgewater et al. .................. 348/409 |

*Primary Examiner*—Amelia Au
*Attorney, Agent, or Firm*—Sughrue, Mion, Zinn, Macpeak & Seas, PLLC

[57] ABSTRACT

A circuit for restoring an image signal using motion compensation is disclosed, which includes an index address generator for storing and selectively generating a start address for each image, an adder for adding the start address generated by the index address generator to an address of a current macroblock to be processed and generating a pseudo address, an address calculator for calculating an address displacement from a motion compensation vector, and an address generator for adding said pseudo address to the address displacement to generate start and end addresses.

9 Claims, 5 Drawing Sheets

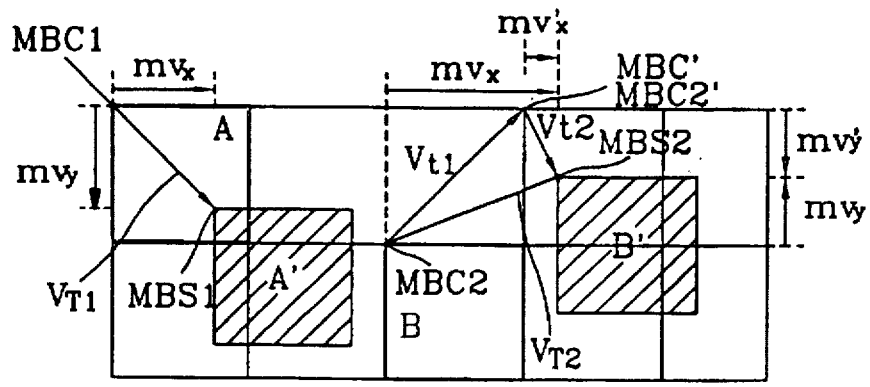
Fig. 4
| 0 | 1 |
|---|---|
| 2 | 3 |
| ⋮ | ⋮ |
| 14 | 15 |
| 16 | 17 |
| ⋮ | ⋮ |
| 30 | 31 |
Fig. 5
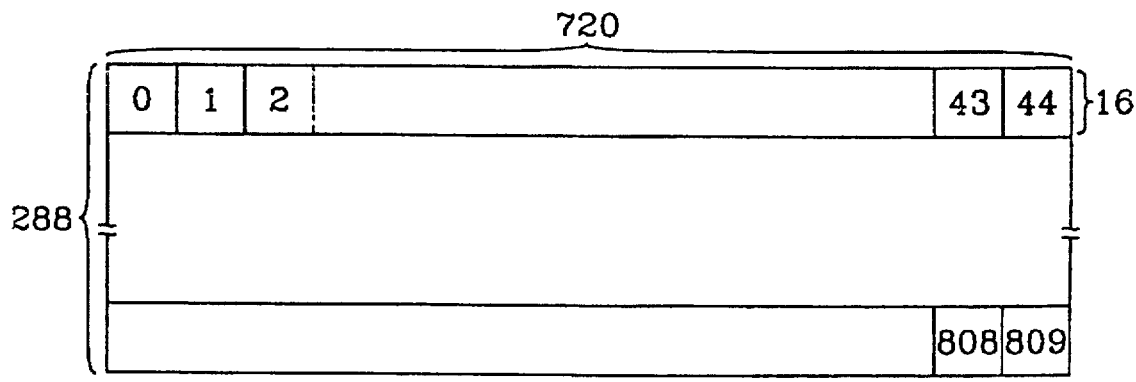
Fig. 6

|   | 0 | 1 | 2 | 3 | · · · · | 9 | 10 | 11 | 12 | 13 | 14 | 15 |
|---|---|---|---|---|---|---|---|---|---|---|---|---|
| 0 | 0 | 1 | 2 | 3 | · · · · | 9 | 10 | 11 | 12 | 13 | 14 | 15 |
| 1 | 16 | 17 | 18 | 19 | · · · · | 25 | 26 | 27 | 28 | 29 | 30 | 31 |
| 2 | 32 | 33 | 34 | 35 | · · · · | 41 | 42 | 43 | 44 | 45 | 46 | 47 |

} 1 FIELD (Y)

| 50 |  |  |  |  | · · · · | 809 | 0 | 1 | 2 | 3 | 4 | 5 |
|----|---|---|---|---|---|---|---|---|---|---|---|---|
|    | 6 | 7 | 8 | 9 | · · · · |  | 16 | 17 | 18 | 19 | 20 | 21 |

} 1 FIELD (Y)

| 100 | 790 | 791 | 792 | 793 | · · · · |  | 800 | 801 | 802 | 803 | 804 | 805 |
|-----|-----|-----|-----|-----|---|---|-----|-----|-----|-----|-----|-----|
| 101 | 806 | 807 | 808 | 809 | 0 | · · · | 6 | 7 | 8 | 9 | 10 | 11 |
| 102 | 12 | 13 | 14 | · · · · |  |  |  |  | 25 | 26 | 27 |
| 103 | 28 | 29 | 30 | · · · · |  |  |  |  | 41 | 42 | 43 |

} 1 FIELD (Cb,Cr)

| 126 | 395 | 396 | 397 | · · · · | 404 | 0 | 1 | 2 | 3 | 4 | 5 | 6 |
|-----|-----|-----|-----|---|-----|---|---|---|---|---|---|---|

} 1 FIELD (Cb,Cr)

| 151 | 390 | 391 | 392 | · · · · | 399 | 400 | 401 | 402 | 403 | 404 | ▨ | ▨ |

REMAINING MACROBLOCK

START AND END ADDRESS GENERATING CIRCUIT FOR PERFORMING MOTION COMPENSATION DURING MOVING PICTURE COMPRESSION CODING

BACKGROUND OF THE INVENTION

1. Field of the Invention

The present invention relates to a motion compensation circuit based on the decoding of an image signal in an image processing system. More particularly, it relates to a circuit for generating an address required to read, from a memory, motion compensation data for a macroblock unit which is used in an image signal following a moving picture expert group (MPEG) standard.

The present application for a motion compensation circuit, is based on Korean Application No. 16282/1995 which is incorporated herein by reference for all purposes.

2. Description of the Related Art

The MPEG is an international standard recommendation for compression coding of a digital moving picture, which is an important technique employed in multimedia environments.

SUMMARY OF THE INVENTION

It is an object of the present invention to provide a circuit for generating an address required to read motion compensation data for a macroblock unit used in a signal following an MPEG format.

In accordance with one aspect of the invention, a circuit for restoring an image signal using motion compensation includes an index address generator for storing and selectively generating a start address for each image, an adder for adding the start address generated by the index address generator to an address of a current macroblock to be processed and generating a pseudo address, an address calculator for calculating an address displacement from a motion compensation vector, and an address generator for adding the pseudo address to the address displacement to generate start and end addresses.

A preferred embodiment of the present invention is described below in detail with reference to the attached drawings.

BRIEF DESCRIPTION OF THE DRAWINGS

FIG. 4 illustrates a processes for calculating a start address by using 16×16 field prediction;

FIG. 5 illustrates a process for allocating an address of a macroblock;

FIG. 6 shows a picture layout;

FIG. 7 shows a macroblock storage structure of a memory;

DETAILED DESCRIPTION OF THE PREFERRED EMBODIMENT

In the following description, specific details such as specific circuit components, the number of bits, variable parameters, etc. are set forth to provide a more through understanding of the invention. It will be apparent, however, to one of ordinary skill in the art, that the invention may be practiced without these specific details. In other instances, well known functions or structures are not described so as not to obscure the invention.

Figure 1:
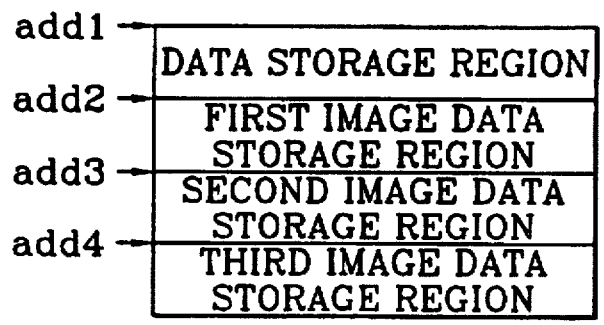
FIG. 1 shows a data storage structure of a memory.

Coded image data is restored to its original unencoded form through a decoding process, and the restored data is stored in a memory in order to restore the next input image data. In an MPEG system, the decoding process employing motion compensation makes reference to two images. Therefore, the memory is divided into 4 regions, as shown in FIG. 1, in order to store a presently processed image, two reference images and spare data. Symbols add1–add4 designate addresses for searching for each region. Each region of the memory constitutes one picture. That is, each region stores data for macroblocks 0–809 corresponding to that displayed on an actual screen as shown in FIG. 6.

Figure 2:
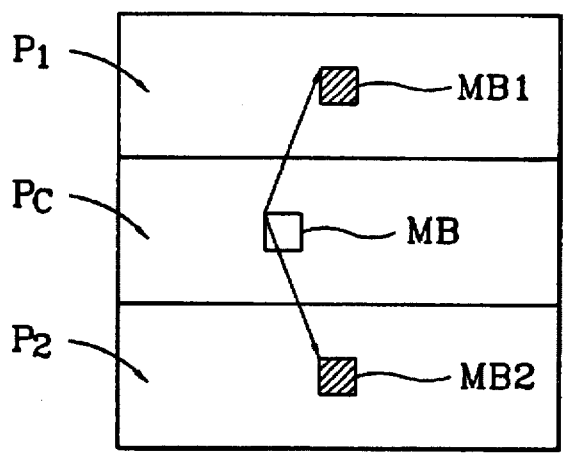
FIG. 2 illustrates a data reference process for motion compensation.

In MPEG-1 and MPEG-2 formats, the basic unit for motion compensation is a macroblock having 16×16 pixels. FIG. 2 shows reference data (reference macroblocks MB1 and MB2) corresponding to a current macroblock MBC. P1 designates a previous picture, PC a current picture and P2 a next picture.

To sequentially read out the reference data from the memory, in order to perform motion compensation, an address of the memory should preferably be calculated with reference to an address for the current macroblock and a motion vector. That is, start and end addresses of reference macroblocks MB1 and MB2 should be calculated. After calculating the start and end addresses, data is read by accessing corresponding addresses of the memory.

Figure 3:
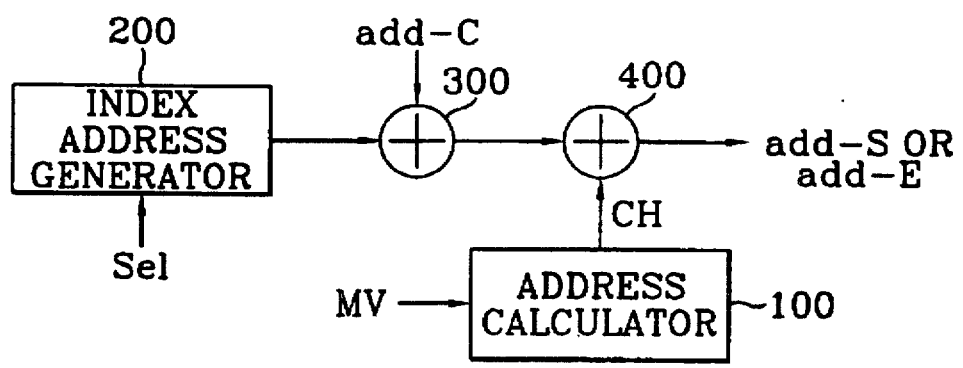
FIG. 3 shows a start and end address generating circuit for motion compensation which is performed during moving picture compression coding, according to the present invention.

FIG. 3 illustrates a start and end address generation circuit for performing motion compensation during moving picture compression coding. An index address generator 200 stores a start address for each image and generates corresponding address information based on a prescribed select signal Sel. An address calculator 100 calculates an address displacement "CH" from a motion compensation vector MV. A first adder 300 adds the address information generated by index address generator 200 to an address add-C of the current macroblock. A second adder 400 adds the output of first adder 300 to address displacement CH to generate a start address add-S or an end address add-E.

FIG. 4 illustrates a process for calculating a start address of a reference macroblock which employs a 16×16 field prediction technique. $V_{T1}$ is a motion vector for restoring a macroblock A, and $mv_y$ and $mv_x$ are input vectors. A vertical shift of one macroblock leads to a shift by 45 macroblocks in the memory, which corresponds to one line as shown in FIG. 6. The start address is calculated from the vectors $mv_x$ and $mv_y$ received for the current macroblock A. To calculate the start address of a reference macroblock, all the address displacements are changed to a positive number. In FIG. 4, since the vectors $mv_x$ and $mv_y$ of $V_{T1}$ are positive numbers, those displacements are used without conversion.

FIG. 5 illustrates a process for allocating address for a macroblock stored in the memory. When storing 720×288 pixels in the memory, as is used in ML and MP of MPEG-2, the following equation is satisfied, where "MB" indicates macroblock:

$$45 \text{ (MB per row address)} \times 18 \text{ (row addresses)} = 810 \text{ (MB)} \quad (1)$$

There are 16 macroblocks per row address, hence;

$$810 \text{ (MB)}/16 \text{ (MB per row)} = 50.625 \text{ (rows)} \rightarrow 50 \text{ (rows)} + 10 \text{ (MB)} \quad (2)$$

FIG. 6 shows the layout of the macroblocks on an actual screen. However, when storing a macroblock in the memory, a macroblock storage structure would appear differently, such as that shown in FIG. 7. This means that an address should be generated based on both the structure of the data stored in memory and the layout on the actual screen. It will readily appreciated why the vectors have a positive value.

Figure 8:
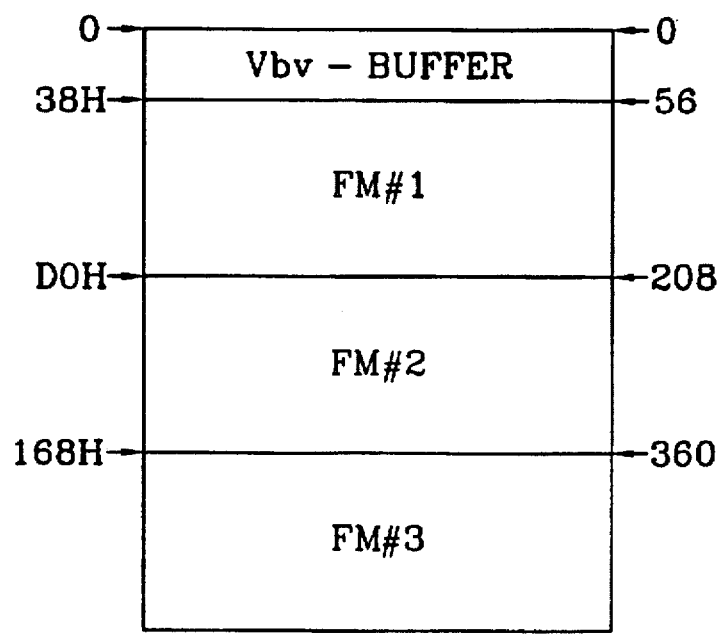
FIG. 8 shows an index address setting structure.

FIG. 8 illustrates an index address setting structure.

The start address for a reference macroblock A' is calculated as shown below in equation 3, where the "/" operator produces only a quotient and the "%" operator produces only a remainder.

$$MB\text{-}start = MBC1 + \{(mv_y/16) \times 45 + (mv_x/16)\}MB + (mv_y\%16)/2 + (mv_x\%16)/8 \quad (3)$$

A motion vector $V_{T2}$ for restoring a macroblock B is represented by vectors $V_{r1}$ and $V_{r2}$, as shown in FIG. 4. Since $mv_y$ is a negative value, the macroblock B is moved to a new macroblock using $V_{r1}$, and then the start address of a reference macroblock B' is calculated using $V_{r2}$ as follows.

$$MB\text{ }start = MBC2 + \{(mv_y \text{ DIV } 16) \times 45 + (mv_x \text{ DIV } 16)\} MB + (mv'_y\%16) + (mv'_x\%16)/8 \quad (4)$$

Where DIV is an operator for producing an integer which rounds a quotient to the nearest smaller integer (for example, $2.2 \rightarrow 2$, $3 \rightarrow 3$, $0.1 \rightarrow 0$, $-0.5 \rightarrow -1$, $-1.5 \rightarrow -2$), $mv'_y = 16 - mv_y\% 16$, and $mv'_x = 16 - mv_x\% 16$.

Figure 9:
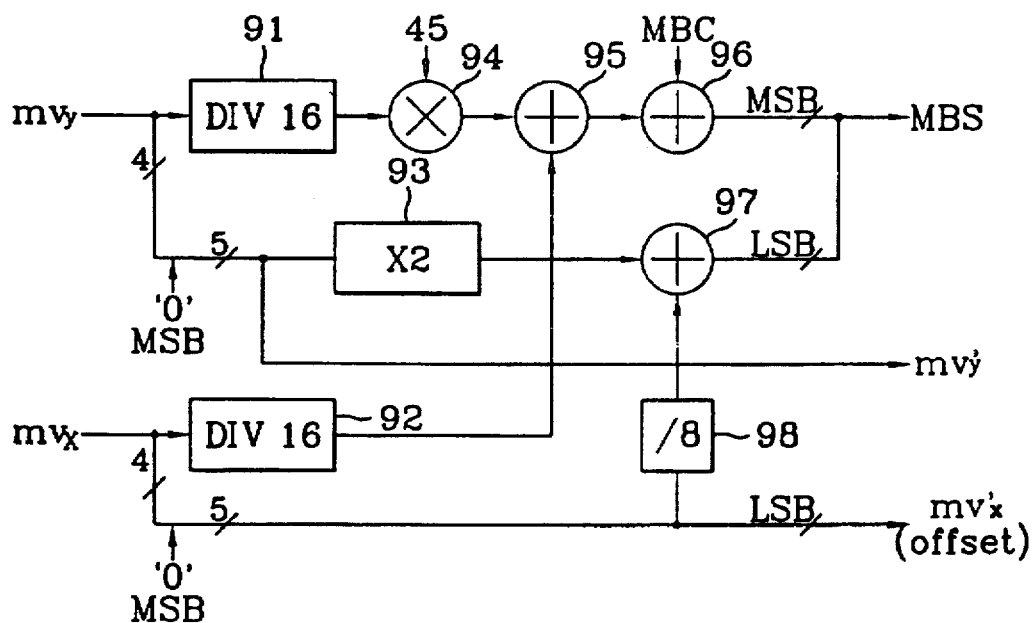
FIG. 9 shows a start address calculation circuit.

A start address calculating circuit is shown in FIG. 9, which can be constructed based on equations (3) and (4). The circuit determines the address in memory at which a reference macroblock starts (i.e., MBS) and then calculates a displacement (i.e., $mv'_x$ and $mv'_y$) from the newly generated vector (i.e., $mv_x$ and $mv_y$), thereby generating the start address.

Figure 11:
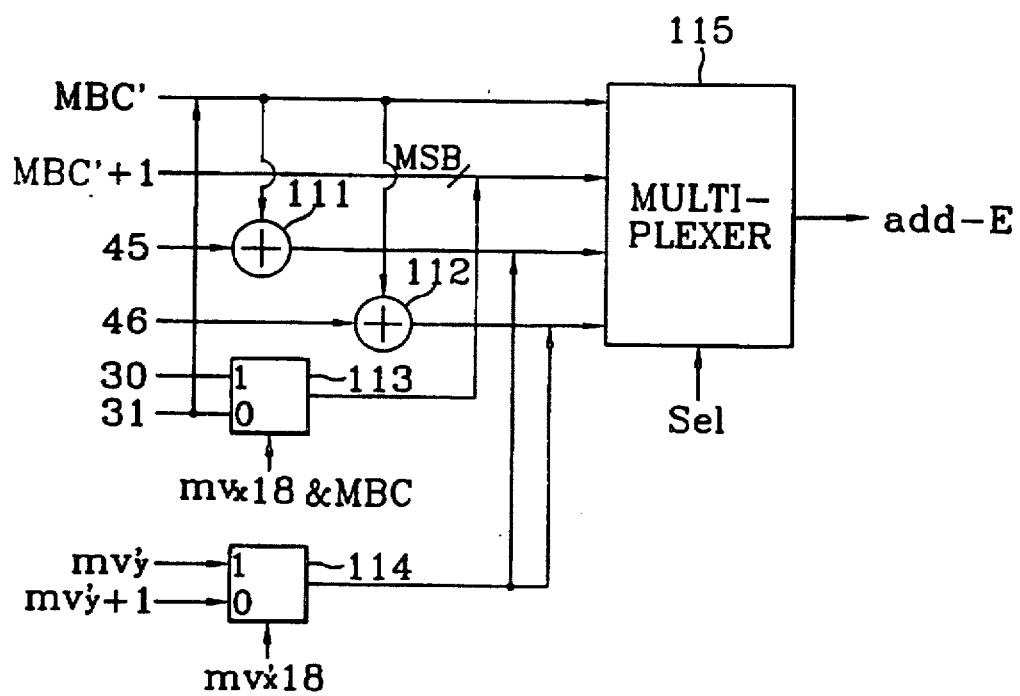
FIG. 11 shows an end address calculation circuit.

FIG. 11 shows an end address calculating circuit. An end address is determined by $mv'_y$ and $mv'_x$, and there are 4 end addresses of 30, 31, $mv'_y$ and $(mv'_x+1)$. When adding the address of the reference macroblock to the above end addresses, a final address is obtained. Then, the reference data is sequentially read from the memory by appropriately combining the start and end addresses.

Figure 10:
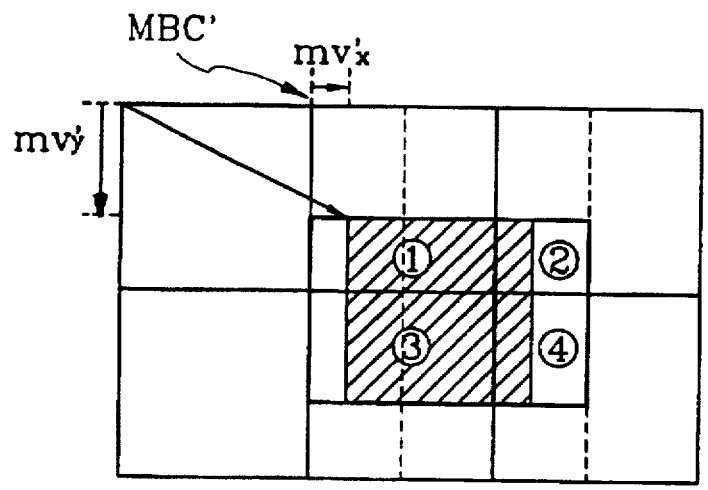
FIG. 10 shows a memory region structure for reference data.

The end address of the data divided on the memory region, as shown in FIG. 10, is generated based on MBC', $mv'_y$ and $mv'_x$ which are supplied to the circuit shown in FIG. 11. The generated end addresses are as follows, where parentheses indicate the 5 least significant bits:

MBC'+(31)

MBC'+1+(30, 31)

MBC'+45 MB+($mv'_y$, $mv'_y$+1)

MBC'+46 MB+($mv'_y$, $mv'_y$+1)    (5).

A multiplexer 115 outputs an end address add-E based on a selected input which correspond to the various regions 1–4 shown in FIG. 10. The first input corresponds to region 1 of FIG. 10 and is the address of the macroblock MBC' combined with the five least significant bits of the value "31". The second input, corresponding to region 2, is the address of the next macroblock (MBC'+1) combined with the five least significant bits of either of the values "30" or "31". Multiplexer 113 determines the value to combine with MBC'+1, based on the signal $mv_x18$&MBC. The third input, corresponding to region 3, is the address of the macroblock MBC' of the next line (MBC'+45 MB) combined with the five least significant bits of either of the values "$mv'_y$" or "$mv'_y+1$". Multiplexer 114 determines the value to combine with MBC', based on the signal $mv'_x18$. The fourth input, corresponding to region 4, is the address of the next macroblock MBC' of the next line (MBC'+46 MB) combined with the five least significant bits of either of the values "$mv'_y$" or "$mv'_y+1$". Multiplexer 114 determines the value to combine with MBC', based on the signal $mv'_x18$.

The selection signal for selecting the end address is generated by combining a signal for the memory region with $mv'_x$.

In an MPEG-2 system, there are various forms of reference methods, and processes for generating addresses varies with each form.

As described above, the start and end addresses for successively reading the reference data from the memory when restoring the image signal using motion compensation are easily calculated.

While there has been shown and described what is considered to be a preferred embodiment of the invention, it will be apparent to a person of ordinary skill in the art that various changes and modifications are possible. Therefore, the invention should be understood as encompassing all possible embodiments which do not depart from the principles of the invention set forth in the appended claims.

What is claimed is:

1. A circuit for restoring an image signal using motion compensation, in which the image signal represents an image and includes image units, the circuit comprising:

index means for storing and selectively generating a start address for the image;

means for adding said start address generated by said index means to an address of a current image unit to be processed and generating a pseudo address;

address calculating means for calculating an address displacement based on a motion compensation vector; and address generating means for adding said pseudo address to said address displacement to generate a start address and an end address, wherein said address calculating means comprises:

first operating means for generating as a first operational value an integer corresponding to a first quotient rounded to the nearest integer less than or equal to said first quotient, wherein said first quotient is obtained by dividing a first motion vector by a first predetermined value;

second operating means for generating a second operational value by multiplying said first operational value by a second predetermined value;

third operating means for generating a third operational value by adding a third predetermined value as the most significant bit to N least significant bits of said first motion vector and then multiplying said third operational value by a fourth predetermined value, wherein N is an integer;

fourth operating means for generating as a fourth operational value an integer corresponding to a second quotient rounded to the nearest integer less than or equal to said second quotient, wherein said second quotient is obtained by dividing a second motion vector by a fifth predetermined value;

fifth operating means for generating a fifth operational value by adding said second operational value to said fourth operational value;

sixth operating means for generating as a sixth operational value a quotient obtained by adding a sixth predetermined value as the most significant bit to M least significant bits of said second motion vector and then dividing the added value by a seventh predetermined value, wherein M is an integer; and seventh operating means for determining the most significant bit of said start address by adding said fifth operational value to said address of the current image unit, and determining the least significant bit of said start address by adding said third operational value to said sixth operational value, and outputting said start address.

2. The circuit as set forth in claim 1, wherein said first predetermined value is 16, said second predetermined value is 45, said third predetermined value is 0, said fourth predetermined value is 2, said fifth predetermined value is 16, said sixth predetermined value is 0, said seventh predetermined value is 8, N is 4 and M is 4.

3. The circuit as set forth in claim 1, wherein said first operating means is a divider, said second operating means is a multiplier, said fourth operating means is a divider, said fifth operating means is an adder, said sixth operating means is a divider, and said seventh operating means includes a first and second adder.

4. The circuit as set forth in claim 1, wherein said address calculating means further comprises an end address calculating apparatus which receives the current image unit address, the adjusted current image unit address and an adjusted motion vector having first and second components for calculating an end address of a reference image unit, said end address calculating apparatus comprising:

a first multiplexer which selects, based on the second component of the motion vector, one of the first component of the adjusted motion vector and the first component of the adjusted motion vector shifted by a predetermined number of image units and outputs a first selected value;

a second multiplexer which selects, based on the second component of the motion vector and the current image unit address, one of seventh and eighth predetermined values and outputs a second selected value;

means for combining the eighth predetermined value with the adjusted current image unit address and outputting a first end address;

means for combining the second selected value with the adjusted current image unit address shifted by a predetermined number of image units and outputting a second end address;

a first adder for adding a ninth predetermined value to the adjusted current image unit address and outputting a third end address;

a second adder for adding a tenth predetermined value to the adjusted current image unit address and outputting a fourth end address; and a third multiplexer which selects one of the first through fourth end address according to a selection signal and outputs the selected end address as the end address of the reference image unit, wherein the selection signal is based on the first component of the adjusted motion vector and a memory region in which the reference image unit is located.

5. The circuit as set forth in claim 4, wherein the predetermined number of image units the adjusted motion vector is shifted is one, the seventh and eighth predetermined values are 30 and 31, respectively, the predetermined number of image units the adjusted current image unit address is shifted is one, and the ninth and tenth predetermined values are 45 and 46, respectively.

6. The circuit as set forth in claim 5, wherein said image unit is a macroblock.

7. An end address calculating apparatus which receives a current image unit address, an adjusted current image unit address and an adjusted motion vector having first and second components for calculating an end address of a reference image unit, the end address calculating apparatus comprising:

a first multiplexer which selects, based on the second component of the motion vector, one of the first component of the adjusted motion vector and the first component of the adjusted motion vector shifted by a predetermined number of image units and outputs a first selected value;

a second multiplexer which selects, based on the second component of the motion vector and the current image unit address, one of first and second predetermined values and outputs a second selected value;

means for combining the second predetermined value with the adjusted current image unit address and outputting a first end address;

means for combining the second selected value with the adjusted current image unit address shifted by a predetermined number of image units and outputting a second end address;

a first adder for adding a third predetermined value to the adjusted current image unit address and outputting a third end address;

a second adder for adding a fourth predetermined value to the adjusted current image unit address and outputting a fourth end address; and a third multiplexer which selects one of the first through fourth end address according to a selection signal and outputs the selected end address as the end address of the reference image unit, wherein the selection signal is based on the first component of the adjusted motion vector and a memory region in which the reference image unit is located.

8. The circuit as set forth in claim 7, wherein the predetermined number of image units the adjusted motion vector is shifted is one, the first and second predetermined values are 30 and 31, respectively, the predetermined number of image units the adjusted current image unit address is shifted is one, and the third and fourth predetermined values are 45 and 46, respectively.

9. The circuit as set forth in claim 7, wherein said image unit is a macroblock.

* * * * *